United States Patent
Wang et al.

(10) Patent No.: US 8,417,003 B2
(45) Date of Patent: Apr. 9, 2013

(54) SYSTEM FOR ESTIMATING LOCATION OF OCCLUDED SKELETON, METHOD FOR ESTIMATING LOCATION OF OCCLUDED SKELETON AND METHOD FOR RECONSTRUCTING OCCLUDED SKELETON

(75) Inventors: Ko-Shyang Wang, Kaohsiung (TW); Yao-Yang Tsai, Kaohsiung (TW); Chih-Pin Liao, Xinshi Township, Tainan County (TW); Wen-Yang Wang, Kaohsiung (TW); Po-Lung Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 209 days.

(21) Appl. No.: 13/039,492

(22) Filed: Mar. 3, 2011

(65) Prior Publication Data

US 2012/0139925 A1  Jun. 7, 2012

(30) Foreign Application Priority Data

Dec. 6, 2010 (TW) .............................. 99142455 A (51) Int. Cl.
*G06K 9/00* (2006.01)
*G09B 23/28* (2006.01)
*A61B 1/32* (2006.01)
*A61B 17/08* (2006.01)

(52) U.S. Cl. ......... 382/128; 434/274; 600/211; 606/157

(58) Field of Classification Search ............... 382/103, 382/107, 128–134; 600/31, 211, 491, 492, 600/494, 495, 499; 604/34, 41, 96.1, 215, 604/907; 606/157; 424/548, 549; 434/274

See application file for complete search history.

(56) References Cited

U.S. PATENT DOCUMENTS

| 6,674,877 B1 * | 1/2004 | Jojic et al. ..................... 382/103 |
| 6,784,826 B2 * | 8/2004 | Kane et al. ...................... 342/28 |
| 7,450,736 B2 * | 11/2008 | Yang et al. .................... 382/103 |
| 2009/0002489 A1 | 1/2009 | Yang et al. |

FOREIGN PATENT DOCUMENTS

| TW | 200818056 | 4/2008 |
| TW | 200828182 | 7/2008 |

OTHER PUBLICATIONS

English language translation of abstract of TW 200818056 (published Apr. 16, 2008).
English language translation of abstract of TW 200828182 (published Jul. 1, 2008).

(Continued)

*Primary Examiner* — Abolfazl Tabatabai
(74) *Attorney, Agent, or Firm* — McClure, Qualey & Rodack, LLP (57) ABSTRACT

A system for estimating a location of an occluded skeleton, a method for estimating a location of an occluded skeleton and a method for reconstructing an occluded skeleton are provided. The method for estimating a location of an occluded skeleton comprises the following steps: Firstly, a trace of a reference central point of a body is estimated according to a plurality of continuously moving images. Next, a human movement state is estimated according to the trace and a motion information of the continuously moving images free of skeleton occlusion. Then, a possible range of the occluded skeleton for maintaining human balance is calculated according to the human movement state. Afterwards, a current motion level of the occluded skeleton is predicted according to a historic motion information of the occluded skeleton. Lastly, the location of the occluded skeleton is estimated according to the current motion level and the possible range.

35 Claims, 8 Drawing Sheets

OTHER PUBLICATIONS

Poppe, R., et al.; "Body-Part Templates for Recovery of 2D Human Poses Under Occlusion;" pp. 1-10.

Gupta, A.; "Constraint Integration for Efficient Multiview Pose Estimation with Self-Occlusions;" pp. 1-8.

Huang, J.B., et al.; "Estimating Human Pose from Occluded Images;" pp. 1-12.

Hayashi, K., et al.; "Pose Estimation From Occluded Images;" pp. 1-6.

* cited by examiner

FIG. 15

SYSTEM FOR ESTIMATING LOCATION OF OCCLUDED SKELETON, METHOD FOR ESTIMATING LOCATION OF OCCLUDED SKELETON AND METHOD FOR RECONSTRUCTING OCCLUDED SKELETON

This application claims the benefit of Taiwan application Serial No. 99142455, filed Dec. 6, 2010, the subject matter of which is incorporated herein by reference.

BACKGROUND

1. Technical Field

The disclosure relates in general to a method for determining gesture, and more particularly to a system for estimating a location of an occluded skeleton, a method for estimating a location of an occluded skeleton and a method for reconstructing an occluded skeleton.

2. Description of the Related Art

Skeleton occlusion is a commonly seen problem in the body gesture identification system, and can further be divided into the occlusion caused by the user's own body or by the environment. Skeleton occlusion incapacitates the identification system of correctly constructing a correct skeleton of human body, so that information such as the user's gesture and the reception of pressure on the joints cannot be correctly determined. In many exercises, such as tai chi or yoga, the user needs to fully understand whether his/her gesture is correct for correction purpose. If the body skeleton is occluded and cannot be reconstructed by the system, the feedback of the user's gesture variance cannot be achieved.

Besides, in the absence of a wireless sensor such as an accelerometer, the position of the occluded skeleton cannot be captured, the real landing position of the foot cannot be correctly evaluated, and the information regarding the pressures applied to the users' knees cannot be obtained. Therefore, how to correctly and promptly reconstruct the occluded skeleton has become a prominent task for the industries.

SUMMARY

The disclosure is directed to a system for estimating a location of an occluded skeleton, a method for estimating a location of an occluded skeleton and a method for reconstructing an occluded skeleton.

According to a first aspect of the present disclosure, a method for estimating a location of an occluded skeleton is disclosed. The method for estimating a location of an occluded skeleton comprises the following steps: Firstly, a trace of a reference central point of a body is estimated according to a plurality of continuously moving images. Next, a human movement state is estimated according to the trace and a motion information of the continuously moving images free of skeleton occlusion. Then, a possible range of the occluded skeleton for maintaining human balance is calculated according to the human movement state. Afterwards, a current motion level of the occluded skeleton is predicted according to a historic motion information of the occluded skeleton. Lastly, the location of the occluded skeleton is estimated according to the current motion level and the possible range.

According to a second aspect of the present disclosure, a method for reconstructing an occluded skeleton is disclosed. The method for reconstructing an occluded skeleton comprises the following steps: Firstly, a trace of a reference central point of a body is estimated according to a plurality of continuously moving images. Next, a human movement state is estimated according to the trace and a motion information of the continuously moving images free of skeleton occlusion. Then, a possible range of the occluded skeleton for maintaining human balance is calculated according to the human movement state. Afterwards, a current motion level of the occluded skeleton is predicted according to a historic motion information of the occluded skeleton. After that, the location of the occluded skeleton is estimated according to the current motion level and the possible range. Lastly, the occluded skeleton is reconstructed according to the location.

According to a third aspect of the present disclosure, a system for estimating a location of an occluded skeleton is disclosed. The system for estimating a location of an occluded skeleton comprises a memory unit and a computational unit. The memory unit records a historic motion information of the occluded skeleton. The computational unit receives a plurality of continuously moving images transmitted from the image capturing unit, and predicts a trace of a reference central point of a body according to continuously moving images. The computational unit estimates a human movement state according to the trace and a motion information of the continuously moving images free of skeleton occlusion, and calculates the location of an occluded skeleton for maintaining human balance according to the human movement state. The computational unit predicts a current motion level of the occluded skeleton according to the historic motion information, and estimates the location of the occluded skeleton according to the current motion level and the possible range.

The above and other aspects of the disclosure will become better understood with regard to the following detailed description of the non-limiting embodiment(s). The following description is made with reference to the accompanying drawings.

DETAILED DESCRIPTION

A method for estimating a location of an occluded skeleton and a method for reconstructing the occluded skeleton are disclosed below. The method for estimating a location of an occluded skeleton comprises the following steps: Firstly, a trace of a reference central point of a body is estimated according to a plurality of continuously moving images. Next, a human movement state is estimated according to the trace and a motion information of the continuously moving images free of skeleton occlusion. Then, a possible range of the occluded skeleton for maintaining human balance is calculated according to the human movement state. Afterwards, a current motion level of the occluded skeleton is predicted according to a historic motion information of the occluded skeleton. Lastly, the location of the occluded skeleton is estimated according to the current motion level and the possible range.

The method for reconstructing an occluded skeleton comprises the following steps. Firstly, a trace of a reference central point of a body is estimated according to a plurality of continuously moving images. Next, a human movement state is estimated according to the trace and a motion information of the continuously moving images free of skeleton occlusion. Then, a possible range of the occluded skeleton for maintaining human balance is calculated according to the human movement state. Afterwards, a current motion level of the occluded skeleton is predicted according to a historic motion information of the occluded skeleton. After that; the location of the occluded skeleton is estimated according to the current motion level and the possible range. Lastly, the occluded skeleton is reconstructed according to the location.

Figure 1:
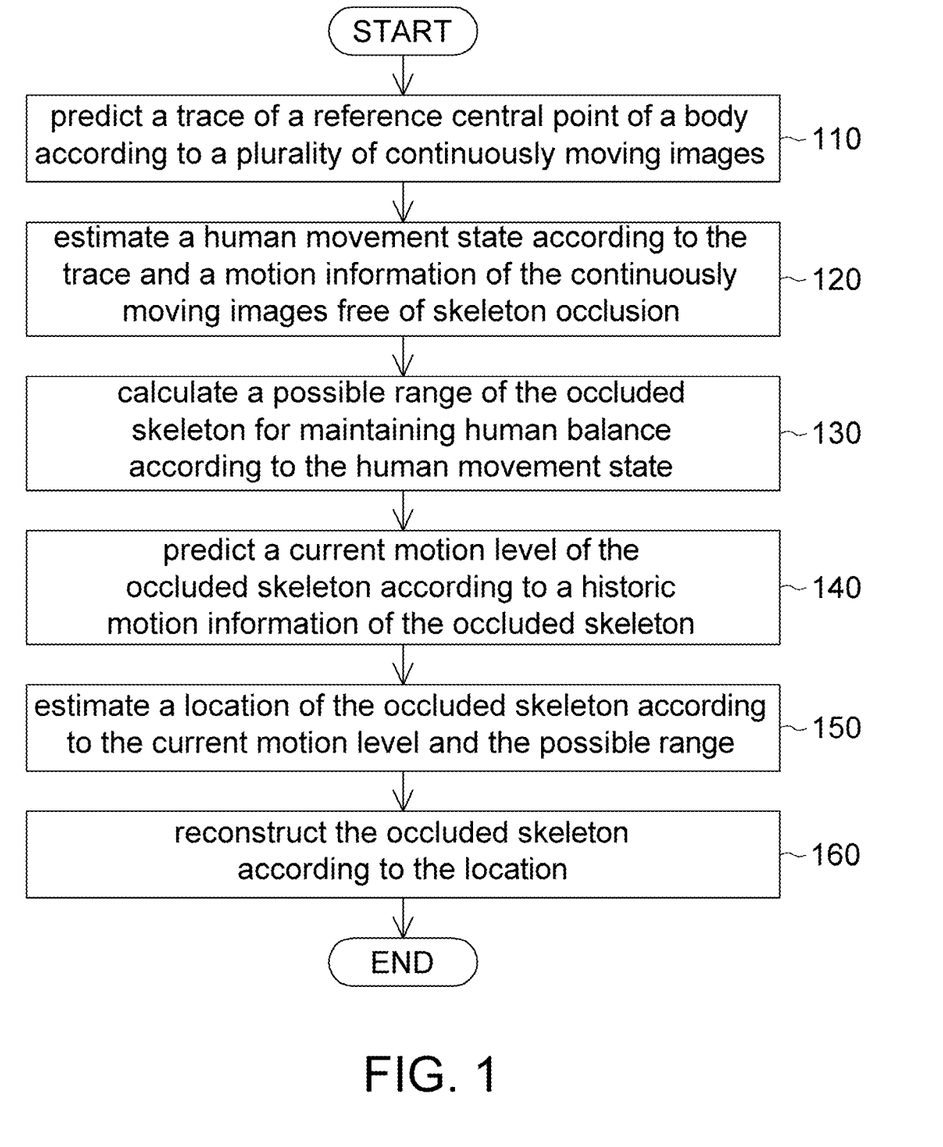
FIG. 1 shows a flowchart of a method for reconstructing an occluded skeleton.
Figure 2:
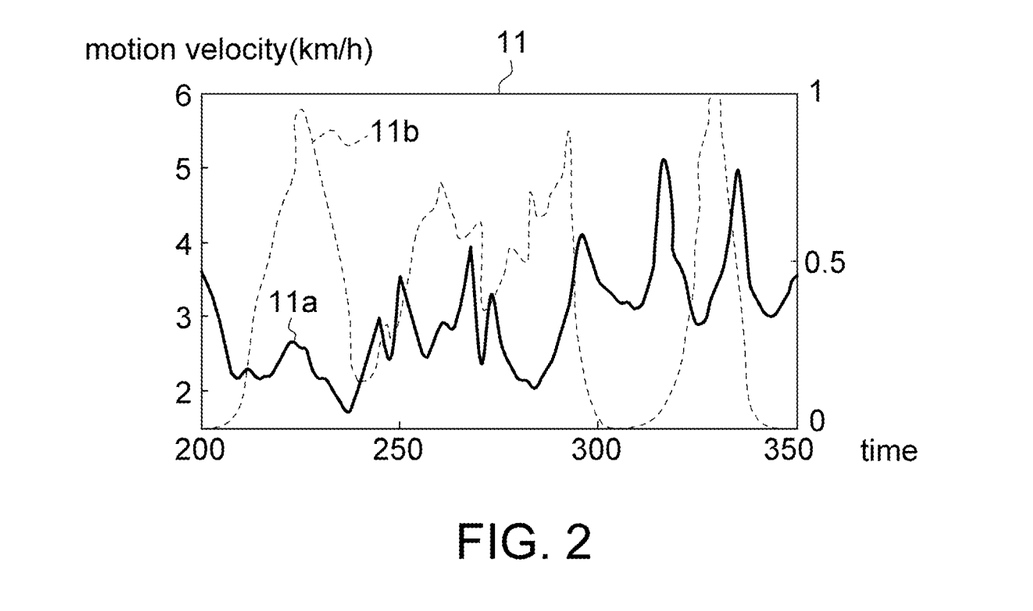
FIG. 2 shows a statistical analysis chart model.
Figure 15:
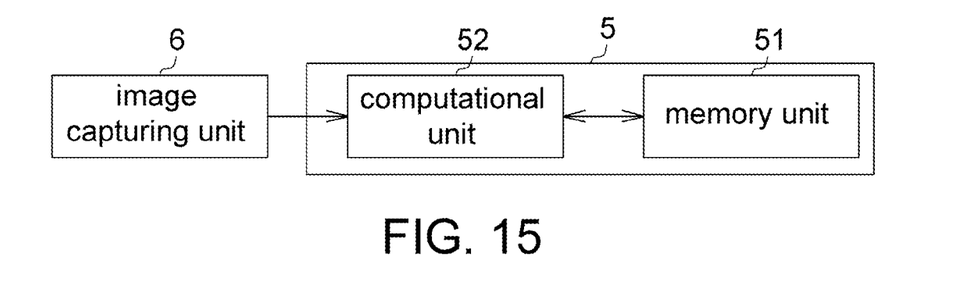
FIG. 15 shows a location estimation system.

Referring to FIG. 1, FIG. 2 and FIG. 15. FIG. 1 shows a flowchart of a method for reconstructing an occluded skeleton. FIG. 2 shows a statistical analysis chart. FIG. 15 shows a location estimation system. For convenience of elaboration below, the skeleton occlusion is exemplified by an occluded foot, and the human movement state is described with an inverted pendulum model. However, the embodiments of the present disclosure are not limited thereto, and the human movement state can also be described with zero moment point (ZMP) or finite state machine (FSM) model. The location estimation system 5 comprises a memory unit 51 and a computational unit 52. The memory unit 51 records a historic motion information of the occluded skeleton. The computational unit 52 receives a plurality of continuously moving images transmitted from the image capturing unit 6, and predicts a trace of a reference central point of a body according to continuously moving images. The computational unit 52 estimates a human movement state according to the trace and a motion information of the continuously moving images free of skeleton occlusion, and calculates the location of the occluded skeleton for maintaining human balance according to the human movement state. The computational unit 52 predicts a current motion level of the occluded skeleton according to the historic motion information, and estimates the location of an occluded skeleton according to the current motion level and the possible range. The method for reconstructing the occluded skeleton can be used in the location estimation system 5. The method for reconstructing an occluded skeleton comprises steps 110, 120, 130, 140, 150 and 160, wherein steps 110, 120, 130, 140 and 150 can be viewed as a method for estimating an occluded skeleton.

Firstly, the method begins at step 110, a trace of a reference central point of a body is estimated by the computational unit 52 according to a plurality of continuously moving images. Next, the method proceeds to step 120, a human movement state is estimated by the computational unit 52 according to the trace and a motion information of the continuously moving images free of skeleton occlusion. Furthermore, a skeleton information can be obtained by analyzing a motion maker's motions in the continuously moving images, and the skeleton information may comprise a non-occluded complete skeleton or an occluded incomplete skeleton. Here below, whether the motion maker' skeleton is occluded is determined according to whether the number of joints is correct.

If the number of joints is correct, this implies that the user's body is not occluded, and the statistics of the skeleton information is analyzed to generate a historic motion information, which can be used as a basis for providing subsequent target data. The historic motion information is such as the statistical analysis chart 11 of FIG. 2. The statistical analysis chart 11 comprises a motion velocity curve 11a with respect to reference central point and a motion level curve 11b. In the statistical analysis chart 11, the horizontal axis denotes time while the left-hand side vertical axis denotes the motion velocity with respect to the reference central point, while the right-hand side vertical axis denotes motion level such as the size of a foot step.

Figure 3:
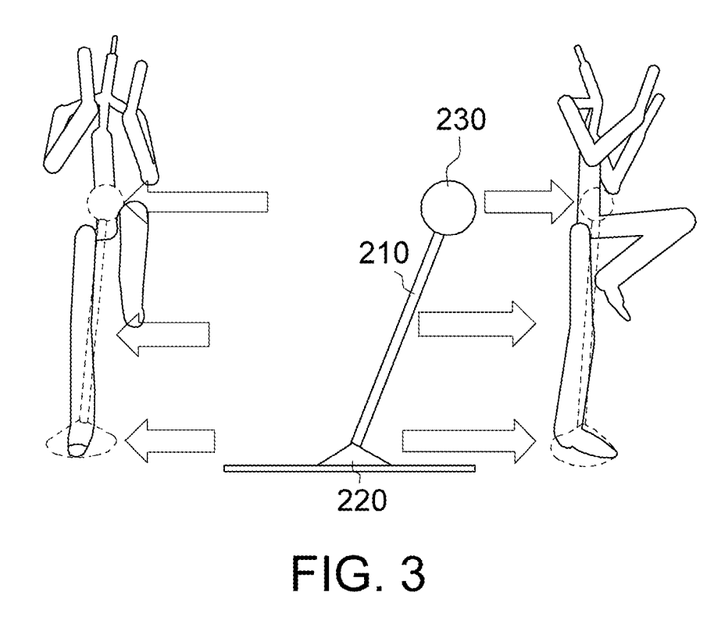
FIG. 3 shows an inverted pendulum model.
Figure 4:
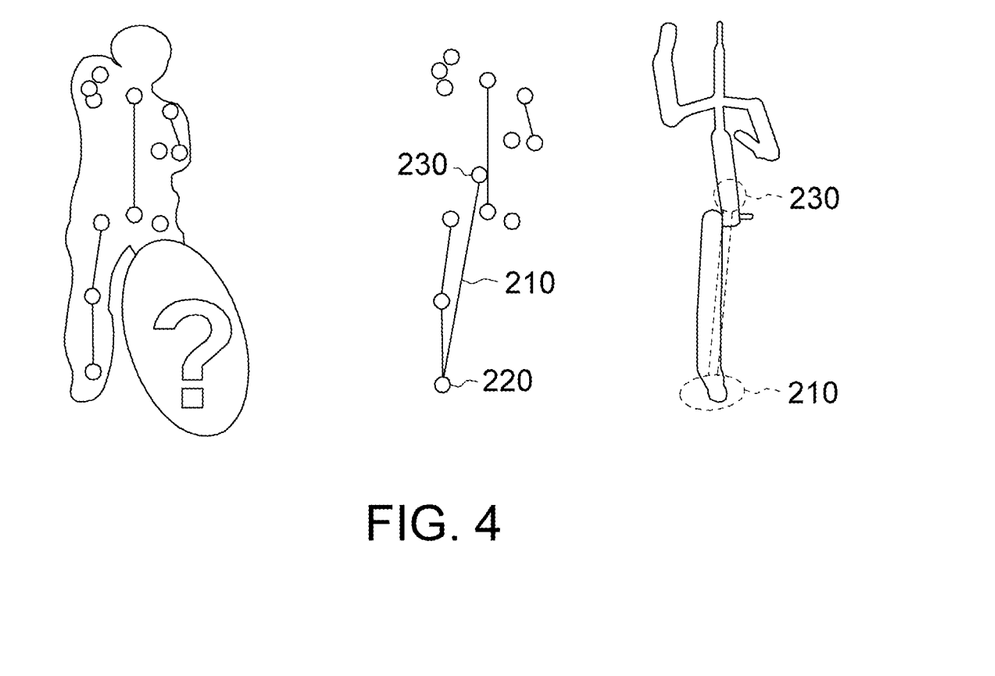
FIG. 4 shows an inverted pendulum model generated by an occluded skeleton.

Referring to both FIG. 3 and FIG. 4. FIG. 3 shows an inverted pendulum. FIG. 4 shows an inverted pendulum model generated by an occluded skeleton. In FIG. 3 and FIG. 4, the human movement state of the motion maker is described with an inverted pendulum model. The inverted pendulum model, such as the inverted pendulum model illustrated in FIG. 3, comprises a weightless pole 210, a fixed fulcrum 220 and a pendulum centroid 230. The two ends of the weightless pole 210 are respectively the pendulum centroid 230 and the fixed fulcrum 220 fixed on the ground. The inverted pendulum model has only one fixed fulcrum 220 fixed on the ground. For maintaining static balance, at least three fulcrums are required and the centroid must be projected within the three fulcrums. Thus, the inverted pendulum model can by no means maintain static balance. In other words, the inverted pendulum model is always in an unstable state, and a mechanism for maintaining dynamic balance is thus required.

The reference central point of a body is such as a center of mass (COM) of the human body. After the skeleton information is inputted and the body state is obtained, the location of the pendulum centroid 230 of the inverted pendulum model will be calculated accordingly. The fixed fulcrum 220 is such as the center of pressure (COP) of a foot of the human body. To form the inverted pendulum model illustrated in FIG. 4, a line connecting the pendulum centroid 230 and the fixed fulcrum 220 is formed.

Figure 5:
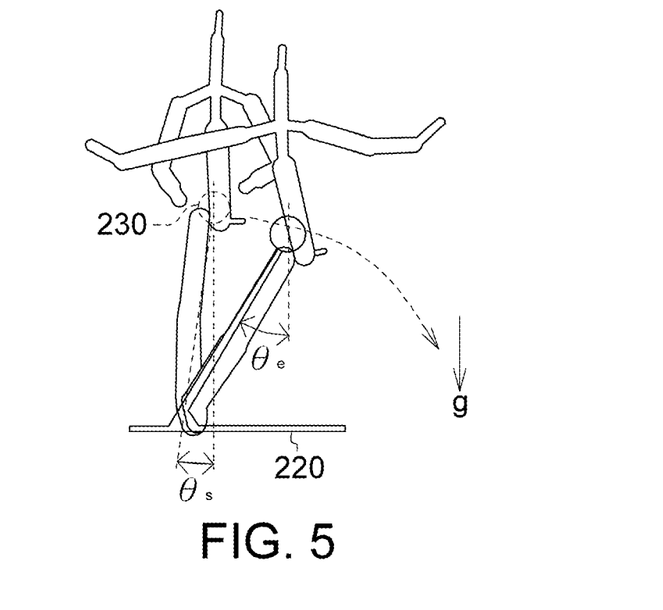
FIG. 5 shows a trace of a reference central point of a body.

Referring to FIG. 5, a trace of a reference central point of a body is shown. Suppose the body is balanced, to estimate the contact position between the sole of an occluded skeleton and the ground, the state and motion trace of the reference central point of a body in the next period of time must be predicted first. When the motion maker's movement state is described with the inverted pendulum model, the reference central point of a body is denoted by the pendulum centroid 230. The conservation of momentum of the trace of the pendulum centroid 230 of FIG. 5 is expressed in formula 1 below:

$$\frac{1}{2}I\omega_s^2 + \int_{\theta_s}^{\theta_e} \tau d\theta = \frac{1}{2}I\omega_e^2 \qquad \text{(formula 1)}$$

Wherein $\tau = mgr \sin \theta$.

In formula 1, $w_s$ denotes the initial angle velocity of the inverted pendulum model. As the torque is generated by the gravity when the pendulum centroid 230 moves from angle $\theta_s$, to angle $\theta_e$, the angle velocity becomes $w_e$. $\tau$ denotes the torque generated by the gravity when the inverted pendulum is at angle θ. m denotes the weight of the pendulum centroid 230. g denotes the gravity acceleration. r denotes the distance between the fulcrum 220 and the pendulum centroid 230, that is, the length of the single pendulum. The trace of the pendulum centroid 230 is obtained from iterative integration of the position and velocity of the pendulum centroid 230 at different time points according to the Runge-Kutta algorithm. The trace is illustrated in FIG. 5.

Figure 6:
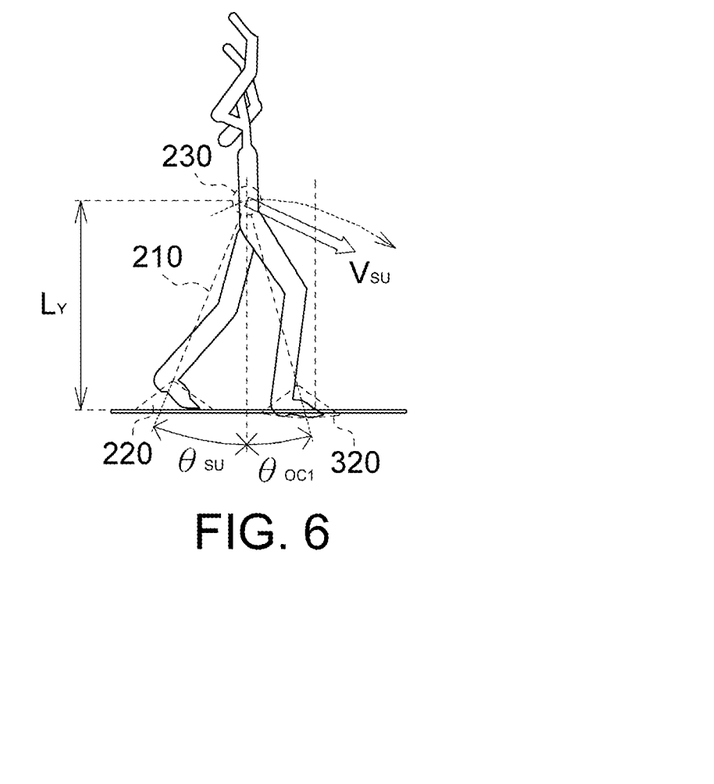
FIG. 6 shows an initial gesture of a human movement state.
Figure 7:
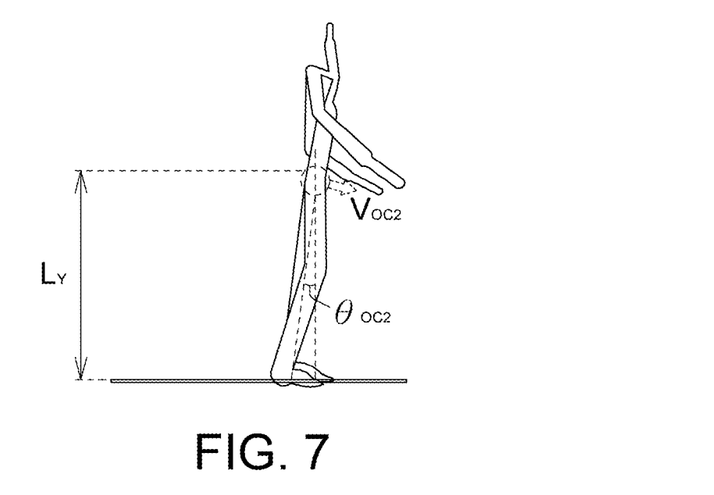
FIG. 7 shows a target gesture of a human movement state.
Figure 8:
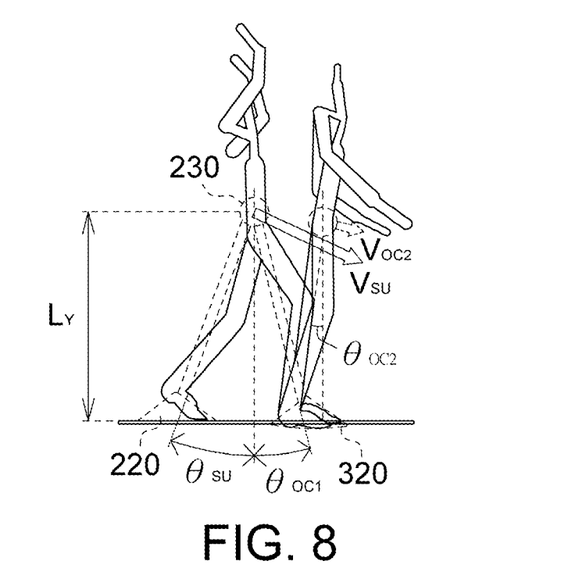
FIG. 8 shows a human movement state changed to a target gesture from an initial gesture.
Figure 9:
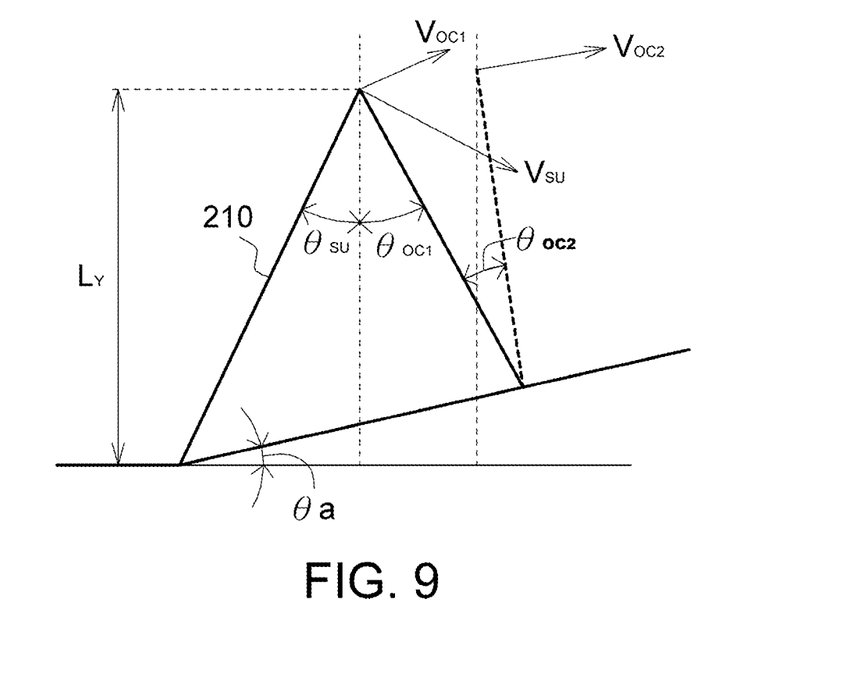
FIG. 9 shows an equivalent diagram of FIG. 8.

Referring to FIGS. 6, 7, 8 and 9. FIG. 6 shows an initial gesture of a human movement state. FIG. 7 shows a target gesture of a human movement state. FIG. 8 shows a human movement state changed to a target gesture from an initial gesture. FIG. 9 shows an equivalent diagram of FIG. 8. Furthermore, when the human movement state changes to a target state of FIG. 7 from an initial state of FIG. 6, the pendulum centroid 230 changes to the target position from the initial position. In FIG. 6, the pendulum centroid 230 has an initial velocity $V_{SU}$ at the initial position, and an initial angle $\theta_{SU}$ is formed between the ground and the line connecting the pendulum centroid 230 and a non-occluded skeleton fulcrum. In FIG. 5, the non-occluded skeleton fulcrum is exemplified by the fulcrum 220. When the pendulum centroid 230 is at the initial position, the height of the pendulum centroid 230 is the height Ly.

In FIG. 6, the pendulum centroid 230 has a target velocity $V_{OC2}$ at the target position, and a target angle $\theta_{OC2}$ is formed between the ground and the line connecting the pendulum centroid 230 and an occluded skeleton fulcrum 320. In FIG. 7, when the pendulum centroid 230 is at the initial position, an occluded skeleton angle $\theta_{OC1}$ is formed between the ground and the line connecting the pendulum centroid 230 and the occluded skeleton fulcrum 320. The target data such as comprises the target velocity $V_{OC2}$ and the target angle $\theta_{OC2}$. In other words, the target velocity $V_{OC2}$ and the target angle $\theta_{OC2}$ can be obtained according to the historic motion information. In addition, when the target state is a standing gesture, the target velocity $V_{OC2}$ and the target angle $\theta_{OC2}$ can be obtained according to a default data. The default data assumes that the target velocity $V_{OC2}$ and the target angle $\theta_{OC2}$ are equal to a default value, such as 0.

Referring to FIG. 1 and FIG. 15. After step 120 is completed, step 130 is performed in subsequence. In step 130, a possible range of the occluded skeleton for maintaining human balance is calculated by the computational unit 52 according to the human movement state. According to the law of conservation of energy, the energy at the initial gesture of the human movement state is equal to the energy at the target gesture of the body state. The equivalent diagram illustrated in FIG. 9 describes the motion process of the occluded skeleton between the initial gesture and the target gesture with the formula of conservation of energy.

$$1/2 I\omega_{OC1}^2 + Mgr\cos\theta_{OC1} = 1/2 I\omega_{OC2}^2 = Mgr\cos\theta_{OC2} \quad \text{(formula 2)}$$

In formula 2, distance r, angle velocity $\omega_{OC1}$ and angle velocity $\omega_{OC2}$ are further denoted in formulas 3, 4 and 5 below.

$$r = \frac{L_y \sin(\pi/2 - \theta_{SU} - \theta_G)}{\cos\theta_{SU} \sin(\pi/2 - \theta_{OC1} + \theta_G)} \quad \text{(formula 3)}$$

$$\omega_{OC1} = \frac{1}{r} V_{OC1} = \frac{1}{r} V_{SU} \cos(\theta_{OC1} + \theta_{SU}) \quad \text{(formula 4)}$$

$$\omega_{OC2} = \frac{1}{r} V_{OC2} \quad \text{(formula 5)}$$

Formula 6 can be obtained by applying formulas 3, 4 and 5 to formula 2. In other words, the equivalent diagram illustrated in FIG. 9 can further be expressed in formula 6, which is a formula of conservation of energy inferred from formula 2.

$$f(\theta_{OC1}) = IV_{SU}^2 \cos(\theta_{OC1} + \theta_{SU}) - 2mgr^3(\cos\theta_{OC2} - \cos\theta_{OC1}) - IV_{OC2}^2 = 0 \quad \text{(formula 6)}$$

In formula 6, the target velocity $V_{OC2}$ and the target angle $\theta_{OC2}$ are both known. To summarize, only the occluded skeleton angle $\theta_{OC1}$ is unknown in formula 6.

Figure 10:
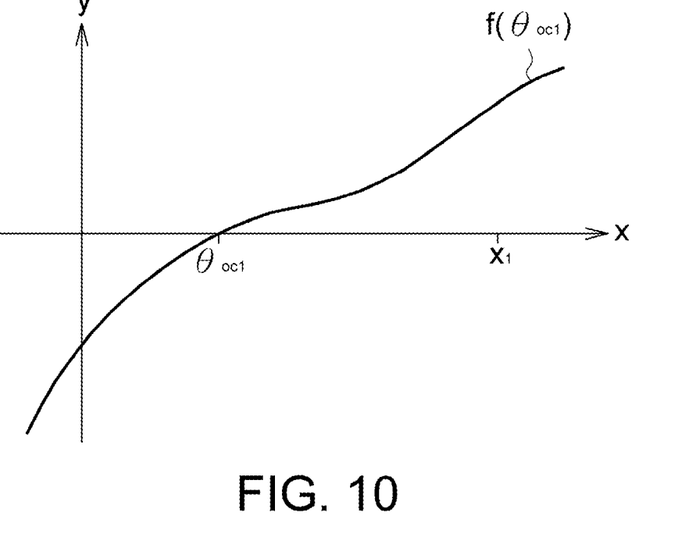
FIG. 10 shows an occluded skeleton angle generated by Newton iteration.
Figure 11:
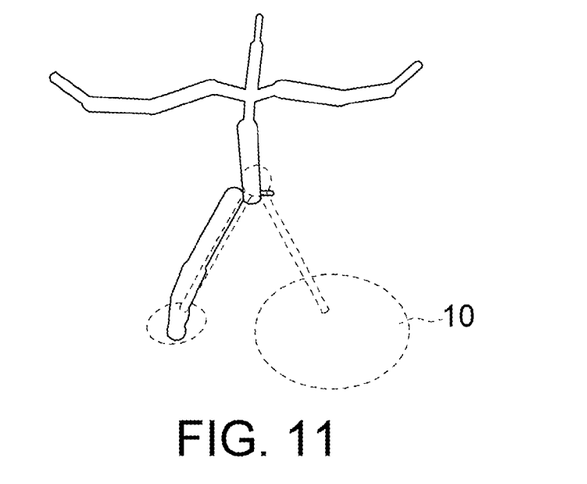
FIG. 11 shows the generation of a range of landing point.

Referring to both FIG. 10 and FIG. 11. FIG. 10 shows an occluded skeleton angle generated by Newton iteration. FIG. 11 shows the generation of a range of landing point. The occluded skeleton angle $\theta_{OC1}$ can further be estimated by a best approximation method of numeric analysis according to the initial velocity $V_{SU}$, the initial angle $\theta_{SU}$, the target velocity $V_{OC2}$, the target angle $\theta_{OC2}$ and the formula of conservation of energy expressed in formula 6. The best approximation method is such as Newton iteration of FIG. 10. After the occluded skeleton angle $\theta_{OC1}$ is obtained, the location of the occluded skeleton for maintaining human balance can then be obtained according to the occluded skeleton angle $\theta_{OC1}$. The location of the occluded skeleton is such as the range of landing point 10 illustrated in FIG. 11.

Referring to FIGS. 1, 2 and 15. After step 130 is completed, step 140 is performed in subsequence. In step 140, a current motion level of the occluded skeleton is predicted by the computational unit 52 according to a historic motion information of the occluded skeleton. The historic motion information is such as the statistical analysis chart 11 illustrated in FIG. 2. When occlusion occurs, a current motion level of the occluded skeleton can be predicted with the assistance of the historic motion information.

Figure 12:
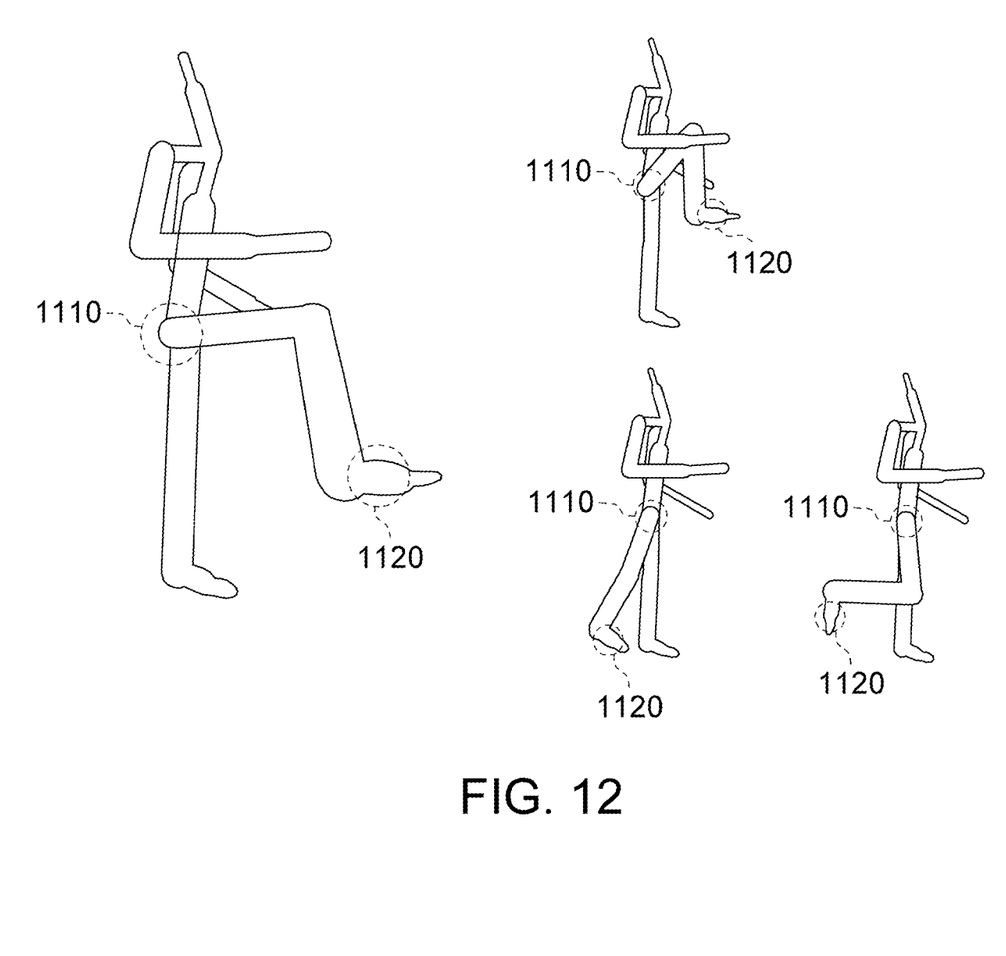
FIG. 12 shows the decomposition of a human body motion according to inverse kinematics.

Referring to FIGS. 1, 12 and 15. FIG. 12 shows the decomposition of a human body motion according to inverse kinematics. After step 140 is completed, step 150 is performed in subsequence. In step 150, the location of the occluded skeleton is estimated by the computational unit 52 according to the current motion level and the possible range. Next, the method proceeds to step 160, an occluded skeleton is reconstructed by the computational unit 52 according to the location. In FIG. 12, the designation 1110 denotes a root and the designation 1120 denotes an end-effector. The joint angle of the limb segment between the two positions will be obtained according to inverse kinematics subjected to the restriction of the two positions. A set of body gesture most natural and conformed to the freedom of human body is obtained according to inverse dynamics to reconstruct the occluded skeleton.

The human movement state can be described with an inverted pendulum model as well as a zero moment point (ZMP) model. Zero torque point means the point at which the sum of the torques of the body torso and the gravity equal to zero. When the zero moment point is inside the supporting region, the human body will eventually achieve or maintain static balance regardless the motion of the human body is dynamic or static. The supporting region refers to the convex hull of the two feet.

The calculation of the zero moment point is expressed as:

$$\sum_i m_i (r_i - P) \times (-\ddot{r} + g) = 0.$$

Wherein, the point P is any point in the space at which the momentum $m_i(r_i-P)\times(-\ddot{r}+g)$ of a limb segment i of the body is received; $m_i$ denotes the mass of the limb segment i. $r_i$ and $\ddot{r}$ respectively denote the position and acceleration of the limb segment i; g denotes the gravity acceleration. When the y axis of the coordinates of point P is subjected to 0, there is only one solution for the point P.

Figure 13:
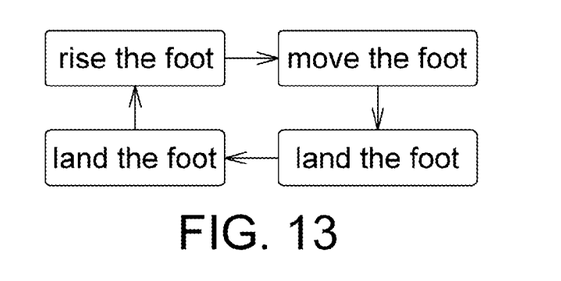
FIG. 13 shows a cycle of human body motion.
Figure 14:
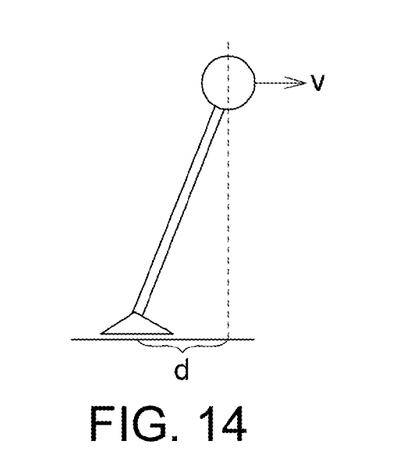
FIG. 14 shows a finite state machine balance model.

Referring to both FIG. 13 and FIG. 14. FIG. 13 shows a cycle of human body motion. FIG. 14 shows a finite state machine balance model. The human movement state can be described with finite state machine (FSM) balance model in addition to the inverted pendulum model and the zero moment point model. The finite state machine is an efficient method for describing the cycle of human body motion. For example, both walking and jogging are a cyclic motion as illustrated in FIG. 13. Thus, the finite state machine can be used for processing the balance model of the human body motion at different stages.

In the finite state machine balance model, each state and the parameters $t_e$ and $d_e$ form the following expression: $d_b = d_0 + c_v v + c_d d$. Wherein, v denotes the current centroid velocity; d denotes a projected horizontal distance from the current centroid to the foot; $d_b$ denotes the target balanced foot landing position; $d_0$ denotes the initial position of the centroid the state; $c_v$ and $C_d$ denote constant parameters. $t_e$ denotes the upper limit of the duration of the state; $d_e$ denotes the upper limit of the switch distance of the state.

The feature of the above method featured by the existence of a non-linear relationship among the three key factors for human balance, namely, the centroid velocity, the centroid position and the balanced landing position. The above method separates the non-linear relationship with the finite state machine model, and describes the relationships among the three factors in the same state with a linear relationship. Thus, the motion balance of certain motion changes can be processed efficiently.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for estimating a location of an occluded skeleton, wherein the method comprises using a processor to perform the steps of:
   predicting a trace of a reference central point of a body according to a plurality of continuously moving images;
   estimating a human movement state according to the trace and a motion information of the continuously moving images free of skeleton occlusion;
   calculating a possible range of the occluded skeleton for maintaining human balance according to the human movement state;
   predicting a current motion level of the occluded skeleton according to a historic motion information of the occluded skeleton; and
   estimating a location of the occluded skeleton according to the current motion level and the possible range.

2. The location estimation method according to claim 1, wherein the human movement state is described with an inverted pendulum model.

3. The location estimation method according to claim 1, wherein the human movement state is described with a zero moment point (ZMP) model.

4. The location estimation method according to claim 1, wherein the human movement state is described with a finite state machine (FSM) model.

5. The location estimation method according to claim 1, wherein the possible range is a range of landing point of the occluded skeleton.

6. The location estimation method according to claim 1, wherein the trace is obtained according to a formula of conservation of momentum.

7. The location estimation method according to claim 6, wherein the trace is obtained from iterative integration of the position and velocity of the reference central point at different time points according to the formula of conservation of momentum and a Runge-Kutta algorithm.

8. The location estimation method according to claim 1, wherein in the step of calculating a possible range, the possible range is calculated according to a formula of conservation of energy and a best approximation method of numeric analysis.

9. The location estimation method according to claim 8, wherein the best approximation method is Newton iteration.

10. The location estimation method according to claim 8, wherein in the step of calculating a possible range, the possible range is calculated according to the formula of conservation of energy, the best approximation method and the historic motion information.

11. The location estimation method according to claim 1, wherein in the step of calculating a possible range, the possible range is calculated according to a formula of conservation of energy, a best approximation method and a default data.

12. The location estimation method according to claim 1, further comprises:
   reconstructing the occluded skeleton according to the location.

13. A method for reconstructing an occluded skeleton, wherein the method comprises:
   predicting a trace of a reference central point of a body according to a plurality of continuously moving images;
   estimating a human movement state according to the trace and a motion information of the continuously moving images free of skeleton occlusion;
   calculating a possible range of the occluded skeleton for maintaining human balance according to the human movement state;
   predicting a current motion level of the occluded skeleton according to a historic motion information of the occluded skeleton;
   estimating a location of the occluded skeleton according to the current motion level and the possible range; and
   reconstructing the occluded skeleton according to the location.

14. The reconstruction method according to claim 13, wherein the human movement state is described with an inverted pendulum model.

15. The reconstruction method according to claim 13, wherein the human movement state is described with a zero moment point (ZMP) model.

16. The reconstruction method according to claim 13, wherein the human movement state is described with a finite state machine (FSM) model.

17. The reconstruction method according to claim 13, wherein the possible range is a range of landing point of the occluded skeleton.

18. The reconstruction method according to claim 13, wherein the trace is obtained according to a formula of conservation of momentum.

19. The reconstruction method according to claim 18, wherein the trace is obtained from iterative integration of the position and velocity of the reference central point at different time points according to the formula of conservation of momentum and a Runge-Kutta algorithm.

20. The reconstruction method according to claim 13, wherein in the step of calculating a possible range, the possible range is calculated according to a formula of conservation of energy and a best approximation method of numeric analysis.

21. The reconstruction method according to claim 20, wherein the best approximation method is Newton iteration.

22. The reconstruction method according to claim 20, wherein in the step of calculating a possible range, the possible range is calculated according to the formula of conservation of energy, the best approximation method and the historic motion information.

23. The reconstruction method according to claim 13, wherein in the step of calculating a possible range, the possible range is calculated according to a formula of conservation of energy, a best approximation method and a default data.

24. A system for estimating a location of an occluded skeleton, wherein the system comprises:
a memory unit for recording a historic motion information of the occluded skeleton; and
a computational unit sued for receiving a plurality of continuously moving images transmitted from a image capturing unit and for predicting a trace of a reference central point of a body according to the continuously moving images, wherein the computational unit estimates a human movement state according to the trace and a motion information of the continuously moving images free of skeleton occlusion, calculates a possible range of the occluded skeleton for maintaining human balance according to the human movement state, predicts a current motion level of the occluded skeleton according to the historic motion information, and estimates a location of the occluded skeleton according to the current motion level and the possible range.

25. The location estimation system according to claim 24, wherein the human movement state is described with an inverted pendulum model.

26. The location estimation system according to claim 24, wherein the human movement state is described with a zero moment point (ZMP) model.

27. The location estimation system according to claim 24, wherein the human movement state is described with a finite state machine (FSM) model.

28. The location estimation system according to claim 24, wherein the possible range is a range of landing point of the occluded skeleton.

29. The location estimation system according to claim 24, wherein the trace is obtained according to a formula of conservation of momentum.

30. The location estimation system according to claim 29, wherein the trace is obtained from iterative integration of the position and velocity of the reference central point at different time points according to the formula of conservation of momentum and a Runge-Kutta algorithm.

31. The location estimation system according to claim 24, wherein the computational unit calculates the possible range according to a formula of conservation of energy and a best approximation method of numeric analysis.

32. The location estimation system according to claim 31, wherein the best approximation method is Newton iteration.

33. The location estimation system according to claim 31, wherein the computational unit calculates the possible range according to the formula of conservation of energy, the best approximation method and the historic motion information.

34. The location estimation system according to claim 24, wherein the computational unit calculates the possible range according to a formula of conservation of energy, a best approximation method and a default data.

35. The location estimation system according to claim 24, wherein the computational unit reconstructs the occluded skeleton according to the location.

* * * * *